United States Patent
Chung et al.

(10) Patent No.: US 9,654,422 B2
(45) Date of Patent: May 16, 2017

(54) INCREASED FABRIC SCALABILITY BY DESIGNATING ROUTER GROUPS

(71) Applicant: Brocade Communications Systems, Inc., San Jose, CA (US)

(72) Inventors: Daniel Chung, San Jose, CA (US); Badrinath Kollu, San Jose, CA (US)

(73) Assignee: Brocade Communications System, Inc., San Jose, CA (US)

( * ) Notice: Subject to any disclaimer, the term of this patent is extended or adjusted under 35 U.S.C. 154(b) by 80 days.

(21) Appl. No.: 14/835,294

(22) Filed: Aug. 25, 2015

(65) Prior Publication Data

US 2017/0063727 A1    Mar. 2, 2017

(51) Int. Cl.
| | | |
|---|---|---|
| H04L 12/28 | (2006.01) | |
| H04L 12/54 | (2013.01) | |
| H04L 12/931 | (2013.01) | |
| H04L 12/24 | (2006.01) | |
| H04L 12/755 | (2013.01) | |
| G06F 17/30 | (2006.01) | |

(52) U.S. Cl.
CPC ........ *H04L 49/357* (2013.01); *G06F 17/3056* (2013.01); *G06F 17/30563* (2013.01); *H04L 41/0806* (2013.01); *H04L 45/021* (2013.01)

(58) Field of Classification Search
CPC .................................................. H04L 49/357
See application file for complete search history.

(56) References Cited

U.S. PATENT DOCUMENTS

| | | | | |
|---|---|---|---|---|
| 7,633,955 | B1 * | 12/2009 | Saraiya | H04L 49/356 370/395.31 |
| 2002/0159385 | A1 * | 10/2002 | Susnow | H04L 12/5693 370/229 |
| 2009/0213867 | A1 * | 8/2009 | Devireddy | G06F 13/387 370/419 |
| 2013/0111374 | A1 * | 5/2013 | Hamilton | H04L 41/22 715/763 |
| 2015/0271104 | A1 * | 9/2015 | Chikkamath | H04L 12/4633 370/401 |

* cited by examiner

*Primary Examiner* — Gerald Smarth
(74) *Attorney, Agent, or Firm* — Blank Rome, LLP

(57) ABSTRACT

Is in a Fibre Channel storage area network (SAN) and its included routers, the routers are placed in groups or pods. Each router only contains router port and fabric access data for routers in the same group or pod. In this manner the size of the relevant tables are reduced, which allows for greater expansion of the SAN as a whole. Each router may be programmed by an administrator with a pod value, indicating the pod containing the router. This value may be provided to the Name Server during router registration and may be requested from the Name Server when developing the router's inter-fabric router (IFR) topology or the pod value can be exchanged in the IF_ILS_HLO messages. Router port database information is only stored from routers in the same pod or provided to routers in the same pod, thus reducing the entries in the router port database.

12 Claims, 5 Drawing Sheets

INCREASED FABRIC SCALABILITY BY DESIGNATING ROUTER GROUPS

BACKGROUND OF THE INVENTION

1. Field of the Invention

The present invention relates generally to storage area networks.

2. Description of the Related Art

Storage area networks (SANs) are becoming extremely large. Some of the drivers behind this increase in size include server virtualization and mobility. With the advent of virtualized machines (VMs), the number of connected virtual host devices has increased dramatically, to the point of reaching scaling limits of the SAN. Classically Fibre Channel fabrics are limited in the number of domains, usually synonymous with switches, that can exist in the fabric, due to both addressing issues and stability issues. Fibre Channel routers were developed as a way to allow the overall SAN to grow larger without having to reach scale limits of any individual fabric.

The operation of the Fiber Channel routers is generally defined in various Fibre Channel specifications, such as FC-IFR, Rev. 1.06, dated May 12, 2010; FC-FS-3, Rev. 1.11, dated Oct. 22, 2010; FC-SW-5, Rev. 8.0, dated Nov. 22, 2006 and FC-LS-2, Rev. 2.00, dated Jun. 26, 2008, all from T11 and all incorporated herein by reference. A portion of the operations includes developing a table to identify which router port can access which fabric. Conventionally this table is a global table and contains information on all of the routers in the fabric. With the continuing growth of SANs, this table can become extremely large and thus a scaling concern itself. Certain efforts have been made to address the problem for particular SAN topologies, such as the use of LSAN zone binding by Brocade Communications, Systems, Inc., but other SAN topologies have not been addressed. Therefore there is a need to address router scaling issues in these other topologies.

SUMMARY OF THE INVENTION

In a Fibre Channel SAN and its included routers according to the present invention, the routers are placed in groups or pods. Each router only contains router port and fabric access data for routers in the same group or pod. In this manner the size of the relevant tables are reduced, which allows for greater expansion of the SAN as a whole.

Each router may be programmed by an administrator with a pod value, indicating the pod containing the router. This value may be provided to the Name Server during router registration and may be requested from the Name Server when developing the router's inter-fabric router (IFR) topology. Alternatively, the pod value can be exchanged in the IF_ILS_HLO messages exchanged between the routers.

As only routers in the same pod have entries placed into the router IFR or port database, the number of entries in the table is greatly reduced from the prior situation where entries from all routers in the SAN were included. This reduced number of entries allows larger SANs to be developed.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION

Figure 1:
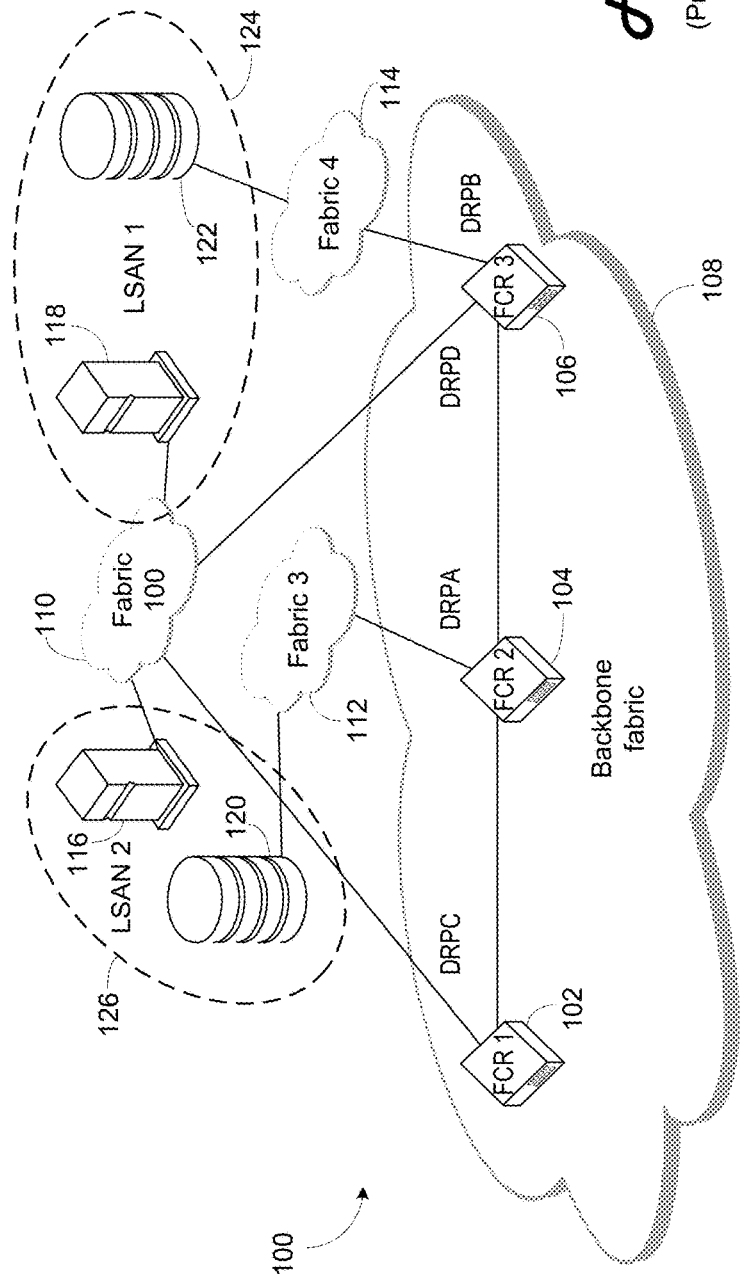
FIG. 1 illustrates an exemplary network according to the prior art.

Referring now to FIG. 1, an exemplary network 100 is illustrated. This network 100 is used to illustrate both the prior art and an embodiment according to the present invention. Three Fibre Channel routers (FCRs) 102, 104, 106 are illustrated as being in a backbone fabric 108. FCR 1 102 is connected to FCR 2 104 and an edge fabric 100 110. FCR 2 104 is connected to an edge fabric 3 112 and FCR 3 106. FCR 3 106 is connected to an edge fabric 4 114 and to edge fabric 100 110. Two hosts 116 and 118 are connected to edge fabric 100 110. A storage device 120 is connected to edge fabric 3 112 and a storage device 122 is connected to edge fabric 4 114. Host 118 and storage device 122 are in LSAN 1 124, while host 116 and storage device 120 are in LSAN 2 126.

Shown below each FCR is its respective router port database. As can be seen, each router port database contains the entries of all router ports connecting to edge fabrics. While this simple example shows a few router port entries, it is remembered that this is a very simple SAN provided for explanatory purposes and a normal SAN where the router port database space is limiting the size of the SAN there are thousands of such entries.

Figure 2:
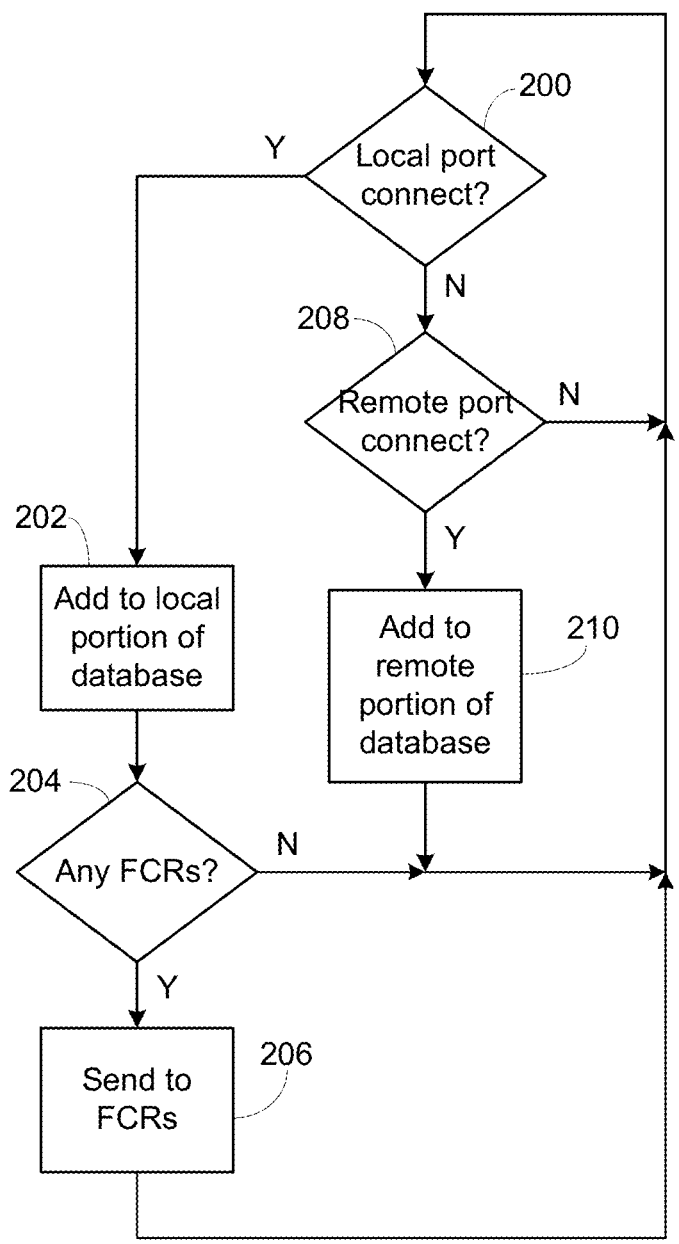
FIG. 2 is a flowchart of operations of a router to develop the router port database according to the prior art.

FIG. 2 is a flowchart of the development of the router port database. In step 200 a router determines if an edge fabric has been connected locally so that a local router port is developed. If so, in step 202 the port is added to the local portion of the router port database. In the preferred embodiment the router port database has local and remote portions for ease of handling. In step 204 it is determined if any FCRs are coupled to the instant FCR performing the operations. For example, if FCR 1 102 is performing the operation, then the other routers are all coupled FCRs. If there are any coupled FCRs, the router port information is provided to the other routers. Operation returns to step 200.

If a local port is not connected, in step 208 it is determined if a remote port has been connected. This can be done when two FCRs are coupled, such as by exchanging IFR topology and router port databases, or when a port is connected for an individual remote FCR. If so, then in step 210 the router port or ports are added to the remote portion of the router port database.

If there has not been a remote port connection in step 208, there are no FCRs in step 204 or after step 210, operation returns to step 200.

It is understood that the actual software may be configured differently from the flowchart of FIG. 2, as FIG. 2 is provided for explanatory purposes. For example, routines or daemons could be executed upon the connection of a port, one for local ports and one for remote ports. As another example, the indicated logic could be a small part of much larger software modules.

Figure 3:
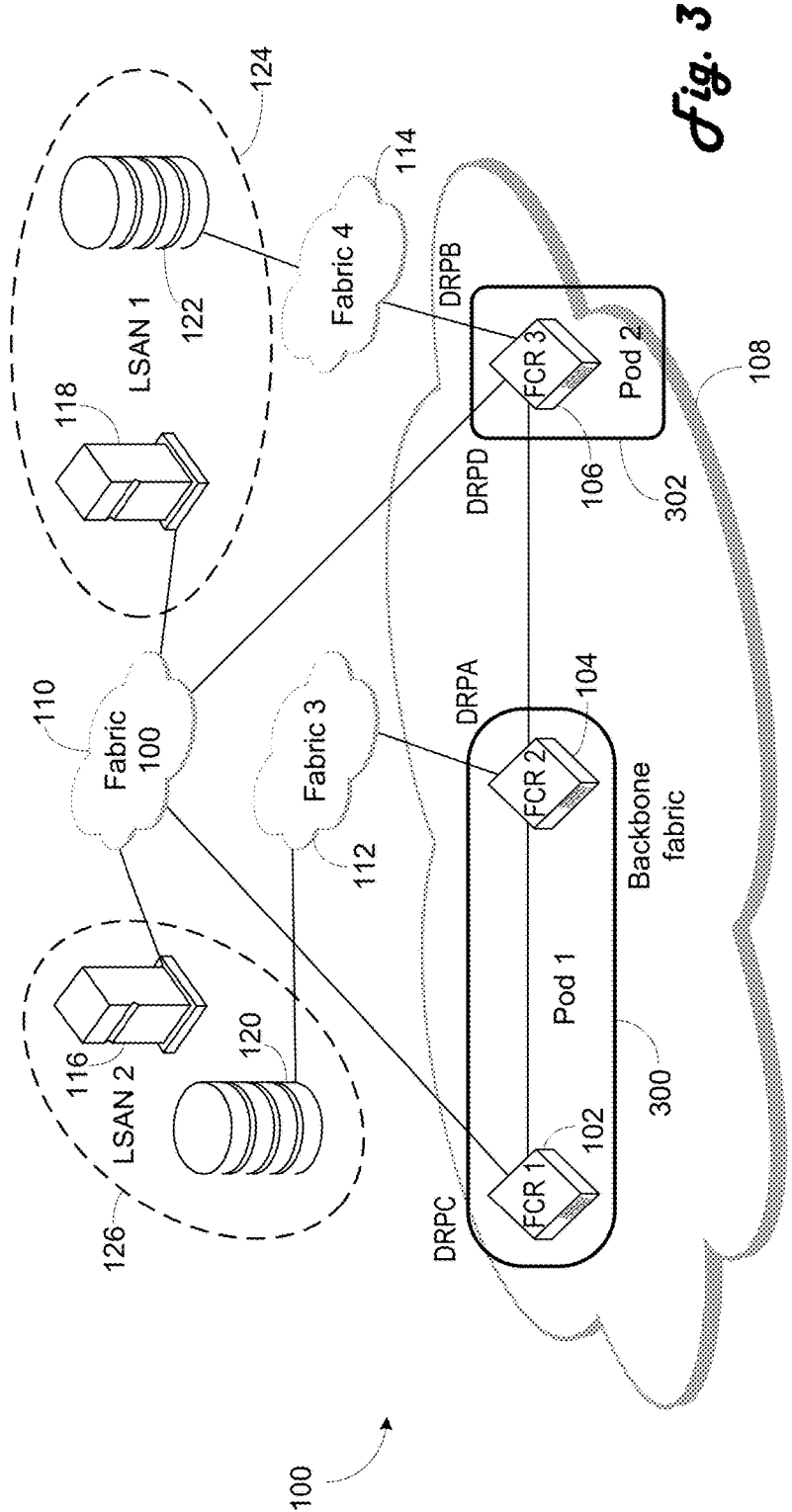
FIG. 3 illustrates the exemplary network of FIG. 1 as changed according to the present invention.

FIG. 3 illustrates the network 100 of FIG. 1 modified according to the present invention. FCR1 102 and FCR2 104 are placed in pod 1 300, while FCR3 106 is placed in pod 2 302. Router port database entries are only developed for routers in the same pod, not all routers in the network as done in the prior art. This results in the databases shown in FIG. 3. FCR1 102 and FCR2 104 only have two ports in their databases, the ports connecting to fabric 3 112 and fabric 100 110. FCR3 106 has only its own ports in the router port database as there are no other routers in pod 2 302.

As can be seen, this reduces the size of the router port database in the present examples by half. In the illustration each host 116, 118 can still access each storage unit 120, 122, assuming proper zoning, but in more complicated environments, which would be the norm in cases where the router port database size is limiting network size, a given host may not be able to access a given storage unit as necessary routers may not be in the same pod. In practice this is generally not a limitation as in most cases careful pod planning can resolve this situation, though in some cases it may be necessary to move hosts or storage units to different edge fabrics. The tradeoff is considered acceptable to address the growth limit issue.

Figures 4A, 4B:
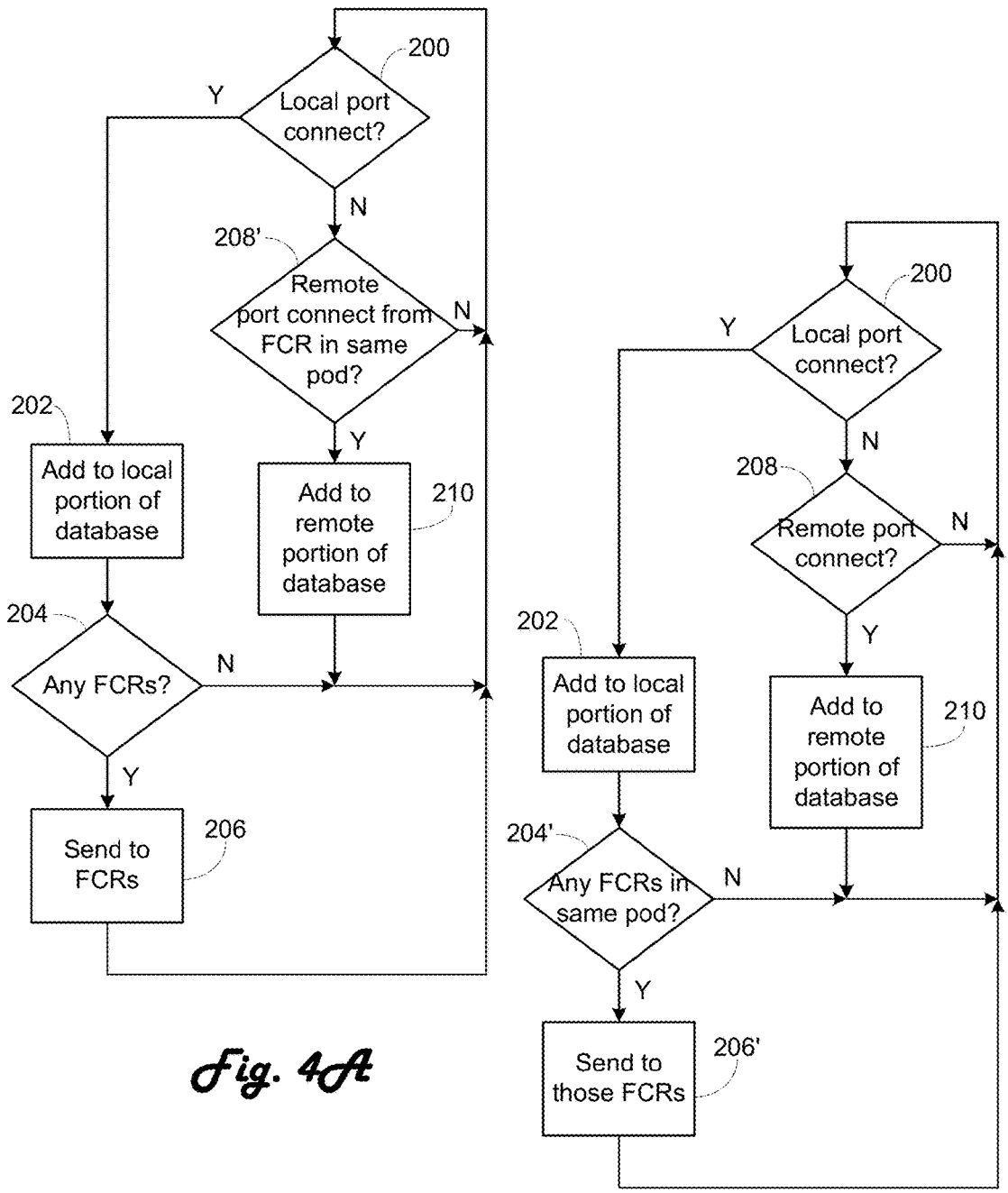
FIGS. 4A and 4B are alternative flowcharts for operation of a router according to the present invention.

FIG. 4A is a first flowchart of router operation according to the present invention. In general operation is the same as illustrated in FIG. 2 except that step 208 is modified to form step 208'. In step 208' it is determined if there is a remote port connection from a router in the same pod, not just any router as done in step 208. Each router is preferably programmed by an administrator with a pod value, indicating the pod containing the router. This value may be provided to the Name Server during router registration and may be requested from the Name Server when developing the router's inter-fabric router (IFR) topology. Alternatively, the pod value can be exchanged in the IF_ILS_HLO messages exchanged between the routers. Thus step 208' limits the inclusion of router ports into the router port database by filtering for matching pod values.

FIG. 4B is a second flowchart of router operation according to the present invention. In general operation is the same as illustrated in FIG. 2 except that steps 204 and 206 are modified to form steps 204' and 206'. In step 204' the determination is whether there are any FCRs in the same pod. If so, then in step 206' only those routers receive the indication of the new port local to the router. Therefore a given router will only receive router port values from other routers in the same pod, thus also limiting the size of the router port database.

In an alternate embodiment steps 204', 206' and 208' can all be present, replacing steps 204, 206 and 208. While either steps 204' and 206' or step 208' should limit the entries in the router port database to those of the same pod, performing both alternatives in one flowchart provides further guarantees.

Figure 5:
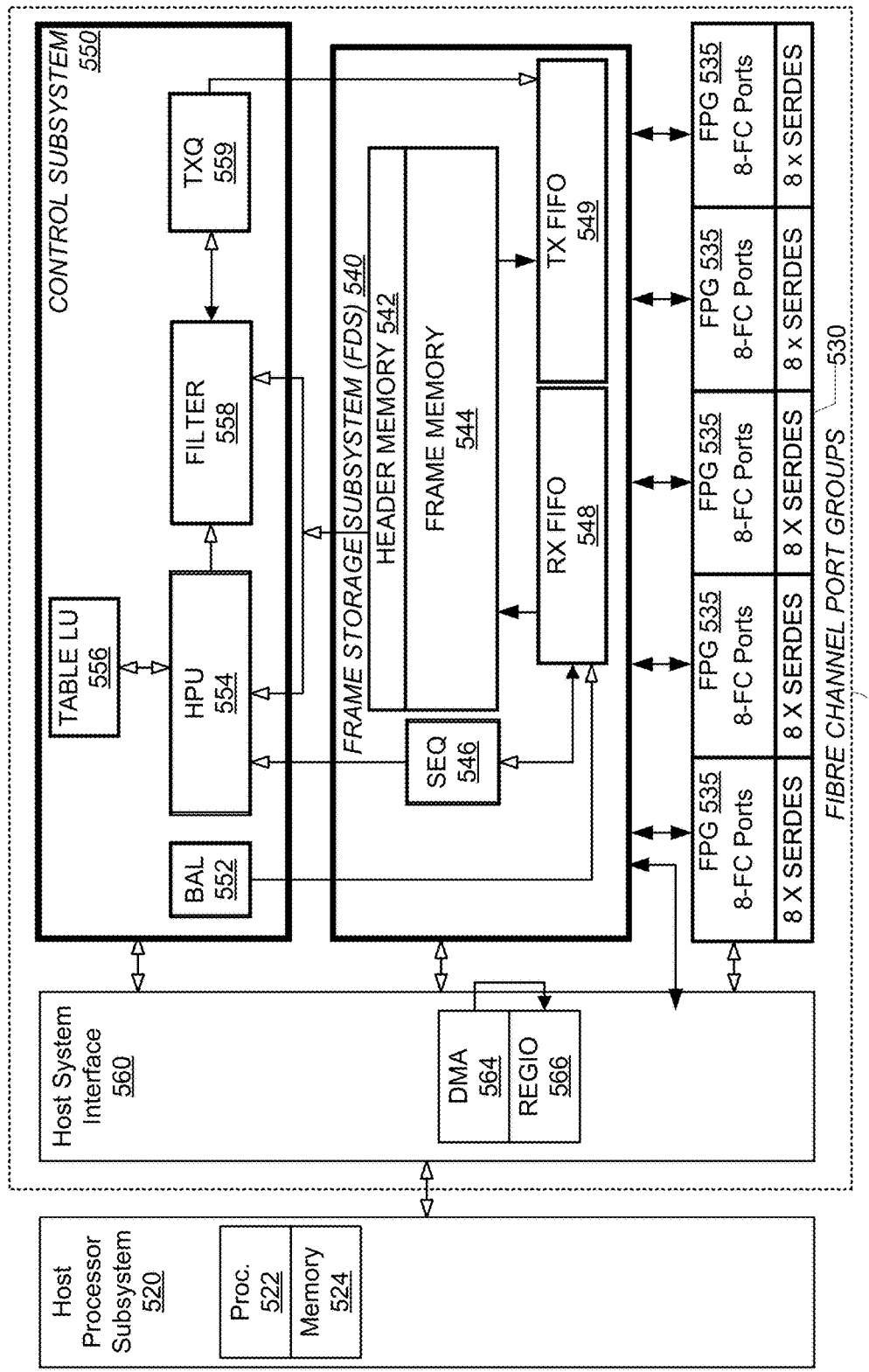
FIG. 5 illustrates a block diagram of an exemplary router according to the present invention.

FIG. 5 is a block diagram of an exemplary router 598. A control processor 590 is connected to a router ASIC 595. The router ASIC 595 is connected to media interfaces 580 which are connected to ports 582. Generally the control processor 590 configures the router ASIC 595 and handles higher level operations, such as the name server, routing table setup, routing port database setup and the like. The router ASIC 595 handles general high speed inline or in-band operations, such as switching, routing and frame translation. The control processor 590 is connected to flash memory 565 or the like to hold the software and programs for the higher level router operations and the router port database operations of FIGS. 4A and 4B; to random access memory (RAM) 570 for working memory, such as the name server and route tables; and to an Ethernet PHY 585 and serial interface 575 for out-of-band management.

The router ASIC 595 has four basic modules, port groups 535, a frame data storage system 530, a control subsystem 525 and a system interface 540. The port groups 535 perform the lowest level of packet transmission and reception. Generally, frames are received from a media interface 580 and provided to the frame data storage system 530. Further, frames are received from the frame data storage system 530 and provided to the media interface 580 for transmission out of port 582. The frame data storage system 530 includes a set of transmit/receive FIFOs 532, which interface with the port groups 535, and a frame memory 534, which stores the received frames and frames to be transmitted. The frame data storage system 530 provides initial portions of each frame, typically the frame header and a payload header for FCP frames, to the control subsystem 525. The control subsystem 525 has the translate 526, router 527, filter 528 and queuing 529 blocks. The translate block 526 examines the frame header and performs any necessary address translations, such as those that happen when a frame is redirected as described herein. There can be various embodiments of the translation block 526, with examples of translation operation provided in U.S. Pat. Nos. 7,752,361 and 7,120,728, both of which are incorporated herein by reference in their entirety. Those examples also provide examples of the control/data path splitting of operations. The router block 527 examines the frame header and selects the desired output port for the frame. The filter block 528 examines the frame header, and the payload header in some cases, to determine if the frame should be transmitted. In the preferred embodiment of the present invention, hard zoning is accomplished using the filter block 528. The queuing block 529 schedules the frames for transmission based on various factors including quality of service, priority and the like.

Therefore by placing the routers in pods, the size of the router table database is reduced, allowing further expansion of the network.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A router comprising:
   at least two ports, at least one port of the at least two ports for connection to a separate local edge fabric, and at least one port of the at least two ports for connection to a backbone fabric containing at least one additional router which is connected to a separate remote edge fabric;
   a processor coupled to the at least two ports; and
   a non-transitory processor readable storage medium coupled to the processor and containing program code to cause the processor to perform the method comprising the steps of:
      receive a designation of the router as being in a first pod;
      populate a router port database with entries for local router ports, wherein a router port is a port connected to a separate edge fabric; and populate the router port database only with entries for remote router ports where the remote router port is connected to an additional router designated as being in the first pod.

2. The router of claim 1, the method further comprising the step of:
transmitting entries for local router ports from the at least one port of the at least two ports for connection to a backbone fabric for each local router port, and
wherein the step of populating the router port database only with entries for remote router ports includes receiving transmissions of router port entries from additional routers and determining the designated pod of an additional router providing router ports entries prior to populating the router port database.

3. The router of claim 1, the method further comprising the step of:
transmitting entries for local router ports from the at least one port of the at least two ports for connection to a backbone fabric for each local router port only to additional routers designated as being in the first pod, and
wherein the step of populating the router port database only with entries for remote router ports includes receiving transmissions of router port entries from additional routers and populating the router port database is done with received router port entries.

4. The router of claim 1, the method further comprising the step of:
transmitting entries for local router ports from the at least one port of the at least two ports for connection to a backbone fabric for each local router port only to additional routers designated as being in the first pod, and
wherein the step of populating the router port database only with entries for remote router ports includes receiving transmissions of router port entries from additional routers and determining the designated pod of an additional router providing router ports entries prior to populating the router port database.

5. A method of operating a router comprising the steps of:
receiving a designation of the router as being in a first pod;
populating a router port database with entries for local router ports, wherein a router port is a port connected to a separate edge fabric; and
populating the router port database only with entries for remote router ports where the remote router port is connected to an additional router designated as being in the first pod.

6. The method of claim 5, the method further comprising the step of:
transmitting entries for local router ports from the at least one port of the at least two ports for connection to a backbone fabric for each local router port, and
wherein the step of populating the router port database only with entries for remote router ports includes receiving transmissions of router port entries from additional routers and determining the designated pod of an additional router providing router ports entries prior to populating the router port database.

7. The method of claim 5, the method further comprising the step of:
transmitting entries for local router ports from the at least one port of the at least two ports for connection to a backbone fabric for each local router port only to additional routers designated as being in the first pod, and
wherein the step of populating the router port database only with entries for remote router ports includes receiving transmissions of router port entries from additional routers and populating the router port database is done with received router port entries.

8. The method of claim 5, the method further comprising the step of:
transmitting entries for local router ports from the at least one port of the at least two ports for connection to a backbone fabric for each local router port only to additional routers designated as being in the first pod, and
wherein the step of populating the router port database only with entries for remote router ports includes receiving transmissions of router port entries from additional routers and determining the designated pod of an additional router providing router ports entries prior to populating the router port database.

9. A non-transitory processor readable storage medium containing program code to cause the processor to perform the method comprising the steps of:
receive a designation of the router as being in a first pod;
populate a router port database with entries for local router ports, wherein a router port is a port connected to a separate edge fabric; and
populate the router port database only with entries for remote router ports where the remote router port is connected to an additional router designated as being in the first pod.

10. The non-transitory processor readable storage medium of claim 9, the method further comprising the step of:
transmitting entries for local router ports from the at least one port of the at least two ports for connection to a backbone fabric for each local router port, and
wherein the step of populating the router port database only with entries for remote router ports includes receiving transmissions of router port entries from additional routers and determining the designated pod of an additional router providing router ports entries prior to populating the router port database.

11. The non-transitory processor readable storage medium of claim 9, the method further comprising the step of:
transmitting entries for local router ports from the at least one port of the at least two ports for connection to a backbone fabric for each local router port only to additional routers designated as being in the first pod, and
wherein the step of populating the router port database only with entries for remote router ports includes receiving transmissions of router port entries from additional routers and populating the router port database is done with received router port entries.

12. The non-transitory processor readable storage medium of claim 9, the method further comprising the step of:
transmitting entries for local router ports from the at least one port of the at least two ports for connection to a backbone fabric for each local router port only to additional routers designated as being in the first pod, and
wherein the step of populating the router port database only with entries for remote router ports includes receiving transmissions of router port entries from additional routers and determining the designated pod of an additional router providing router ports entries prior to populating the router port database.

\* \* \* \* \*